United States Patent
Faehrmann et al.

(10) Patent No.: US 9,854,173 B2
(45) Date of Patent: Dec. 26, 2017

(54) VIEWFINDER AND OPERATING UNIT

(71) Applicant: Arnold & Richter Cine TEchnik GmbH & Co. Betriebs KG, Munich (DE)

(72) Inventors: Tom Faehrmann, Munich (DE); Michael Koppetz, München (DE); Timo Sperber, Munich (DE)

( * ) Notice: Subject to any disclaimer, the term of this patent is extended or adjusted under 35 U.S.C. 154(b) by 0 days.

(21) Appl. No.: 14/472,734

(22) Filed: Aug. 29, 2014

(65) Prior Publication Data
US 2015/0070559 A1  Mar. 12, 2015

(30) Foreign Application Priority Data
Sep. 11, 2013  (DE) .......... 10 2013 218 222

(51) Int. Cl.
 H04N 5/232 (2006.01)
 H04N 5/225 (2006.01)
(52) U.S. Cl.
 CPC ....... H04N 5/23293 (2013.01); H04N 5/2252 (2013.01)
(58) Field of Classification Search
 CPC ..... H04N 5/232; H04N 5/225; H04N 5/23293
 USPC .................................................. 348/333.06
 See application file for complete search history.

(56) References Cited

U.S. PATENT DOCUMENTS

| | | | |
|---|---|---|---|
| 5,548,334 A | 8/1996 | Ichiyoshi | |
| 5,905,525 A | 5/1999 | Ishibashi et al. | |
| D410,662 S * | 6/1999 | Harata | D16/202 |
| 6,215,461 B1 | 4/2001 | Ishibashi et al. | |
| D441,385 S * | 5/2001 | Miyashita | D16/202 |
| 7,391,467 B2 | 6/2008 | Kim | |
| 7,394,485 B2 | 7/2008 | Kim | |
| 7,405,751 B2 | 7/2008 | Lee et al. | |
| 7,616,392 B2 | 11/2009 | Igarashi et al. | |

(Continued)

FOREIGN PATENT DOCUMENTS

| | | |
|---|---|---|
| DE | 4304506 A1 | 8/1994 |
| EP | 1 480 452 A1 | 11/2004 |

(Continued)

OTHER PUBLICATIONS

Search Report dated Feb. 28, 2014 relating to DE 10 2013 218 222.8.
U.S. Appl. No. 29/466,722, filed Sep. 11, 2013.

*Primary Examiner* — Antoinette Spinks
(74) *Attorney, Agent, or Firm* — Dinsmore & Shohl LLP (57) ABSTRACT

A viewfinder and operating unit for a video camera is configured separate from the video camera and comprises a main body, an electronic viewfinder and an operating device pivotably fastened to the main body for the configuring and/or controlling of the video camera. The electronic viewfinder has a viewfinder display as well as an eyepiece having an optical axis. The operating device has an areal operating field display and is pivotable into at least two different positions relative to the main body. The operating device projects from the main body in a cameraman operating position and an observation axis aligned perpendicular to the areal operating field display extends in parallel with the optical axis of the eyepiece as well as laterally offset therefrom. The observation axis of the operating field display is aligned perpendicular to the optical axis of the eyepiece in an assistant operating position.

27 Claims, 4 Drawing Sheets

(56) References Cited

U.S. PATENT DOCUMENTS

| | | | |
|---|---|---|---|
| 8,023,033 | B2 | 9/2011 | Kirihara et al. |
| D769,955 | S * | 10/2016 | Faehrmann ................. D16/202 |
| 2003/0179306 | A1 | 9/2003 | Lee |
| 2008/0198253 | A1 | 8/2008 | Yanagisawa |
| 2008/0284895 | A1 | 11/2008 | Kaji et al. |
| 2009/0059397 | A1 | 3/2009 | Igarashi et al. |
| 2009/0060465 | A1 | 3/2009 | Igarashi et al. |
| 2011/0102669 | A1 * | 5/2011 | Yano ...................... G03B 17/18 |
| | | | 348/376 |

FOREIGN PATENT DOCUMENTS

| | | | |
|---|---|---|---|
| EP | 2034720 | A2 | 3/2009 |
| JP | 03056923 | B2 | 3/1991 |
| JP | 3-208475 | B2 | 9/1991 |
| JP | 2005006098 | A | 1/2005 |
| JP | 2009063774 | A | 3/2009 |
| JP | 2009065396 | A | 3/2009 |
| JP | 2009065397 | A | 3/2009 |

* cited by examiner

VIEWFINDER AND OPERATING UNIT

CROSS-REFERENCE TO RELATED APPLICATIONS

This application claims priority of German Patent Application DE102013218222.8 filed on Sep. 11, 2013.

FIELD OF THE INVENTION

The present invention relates to a viewfinder and operating unit for a video camera (also referred to as an electronic movie camera) which is configured separate from the video camera and comprises a main body, an electronic viewfinder and an operating device.

BACKGROUND OF THE INVENTION

Video cameras typically have both a viewfinder and an operating device, with the viewfinder and the operating device being configured functionally and constructionally separate.

The respective picture section detected or detectable by the video camera can be observed using the viewfinder. An optical viewfinder can be used for this purpose with respect to which a taking beam path of the video camera can be branched off. With digital video cameras, in particular electronic viewfinders are also used which display video data (i.e. moving image data) such as, for instance, the respective picture section detected by an image sensor of the video camera on a viewfinder display which can be observed through a premounted eyepiece.

An operating device of the video camera can in particular serve to configure and/or to control the video camera. In addition, the video camera can have an operating field display which can, for example, serve for the display of configuration values or of a graphical user interface for setting configuration values.

The electronic viewfinder and the operating device of a video camera are typically configured as components of the video camera and are arranged directly thereat or are even integrated therein. It is, however, also possible to configure an electronic viewfinder as a separate unit which can be connected to the video camera, optionally via a viewfinder holder. In addition, operating devices can be configured separate from a video camera and can be connected to the video camera to be able to configure and/or control the video camera remotely.

Alternatively or additionally to an electronic viewfinder, a monitor display can also be provided at a video camera. A monitor display differs from a viewfinder to the extent that it can be observed from different angles of view and by a plurality of persons simultaneously without further optical elements, whereas the viewfinder display of an electronic viewfinder is as a rule observed through an eyepiece which is arranged in front of the viewfinder display. In this respect, the eyepiece is configured such that the viewfinder display is observed by a single eye moved close to the eyepiece. The eyepiece typically has an eye cup for this purpose which outwardly closes the region between the eyepiece and the eye by which the viewfinder display is observed.

A monitor display can serve, for example, to display status information and/or video data of the video camera, in particular the respective picture section detected by the image sensor. In this manner, the video data cannot only be observed by one single person, namely the cameraman, through the viewfinder, but at the same time also by further persons such as an assistant cameraman, a sound engineer or the director. For this purpose, the monitor display can also be spaced apart from the video camera and can be connected to the video camera by means of a cable, for example. The provision of a monitor display also increases the movement flexibility for the cameraman since an observation of the video data can take place from a completely different perspective than a conventional electronic viewfinder permits, for example when the video camera is to be held and guided just above the ground by means of a handhold.

Such viewfinders, operating devices or monitor displays separate from the respective video camera admittedly provide the advantage with respect to devices integrated into the video camera of being more flexibly adaptable to different application cases in this respect since they can offer more possibilities of the spatial arrangement and alignment relative to the video camera. However, separate devices mean higher production and purchase costs. In addition, separate devices each have to be connectable to the video camera, for which purpose the video camera has to provide different connections and interfaces, which causes an increased construction effort in the video camera. If the operation and the image design function are spatially separate, this can also be disadvantageous from ergonomic aspects.

If only one single display is provided which can be used as required as a monitor display (for presenting status information) or as a viewfinder display (for an electronic viewfinder), an additional mechanism for the selective removal of an observation optics (eyepiece) is required.

SUMMARY OF THE INVENTION

It is an object of the invention to provide a viewfinder and operating unit for a video camera which can be used in a compact, inexpensive and versatile manner.

The object is satisfied by a viewfinder and operating unit having the features of claim 1 and in particular in that it is configured separate from the video camera and comprises a main body, an electronic viewfinder and an operating device for configuring and/or controlling the video camera, wherein the electronic viewfinder is arranged at an end face of the main body and has a viewfinder display for displaying video data of the video camera as well as an eyepiece for observing the viewfinder display and wherein the operating device is pivotably fastened to the main body and is associated with a side face of the main body and has an areal operating field display. In addition, the operating device is pivotable relative to the main body in at least two different positions, wherein the operating device projects from the main body in a cameraman operation position and an observation axis aligned perpendicular to the center of the areal operating field display in parallel with an optical axis of the eyepiece and laterally offset therefrom, and wherein the observation axis of the operating field display is aligned perpendicular to the optical axis of the eyepiece in an assistant operation position and a rear side of the operating device contacts the named side face of the main body.

On the one hand, an electronic viewfinder and, on the other hand, an operating device are arranged at the main body of the viewfinder and operating unit. Different devices are thereby connected to form one unit in the viewfinder and operating unit. The viewfinder and operating unit can thus be used both to observe video data of the video camera and to correct and/or to control the video camera. In addition, the viewfinder and operating unit comprises a total of two displays, namely the viewfinder display of the electronic viewfinder and the areal operating field display of the operating device, on which two displays respective content (the same or different) can be presented.

In this manner, a plurality of functions are advantageously linked to one another in a single viewfinder and operating unit. On the one hand, a respective video camera can be configured and/or controlled by means of the viewfinder and operating unit. This can in particular take place assisted by the operating field display which can, for example, display a graphical user interface or a menu structure or can serve as an input device for the configuration and/or control of the video camera, for instance by means of a touch-sensitive surface. On the other hand, the viewfinder and operating unit can display recorded video data and/or video data currently detected by an image sensor of the video camera, with the display of the video data selectively taking place on the viewfinder display of the electronic viewfinder and/or of the operating field display of the operating device. The viewfinder and operating unit can thus be used (simultaneously or alternately) both as a viewfinder for the masked observation of video data with only one eye and as a monitor for a spaced apart observation of the video data from different angles of view.

The electronic viewfinder is in particular arranged at an end face of the main body to allow and make comfortable a simultaneous use of the electronic viewfinder and of the operating device of the viewfinder and operating unit, whereas the operating device is associated with a side face of the main body and is moreover pivotably fastened to the main body. The named end face of the main body (at which the electronic viewfinder is arranged) and the named side face of the main body (with which the operating device is associated) can in particular substantially be aligned at right angles to one another.

The recorded video data are as a rule observed through the viewfinder by the cameraman during an ongoing shoot. Since the viewfinder is arranged at an end face and the operating device is arranged at a side face, the operating device also remains accessible and is not covered during the use of the electronic viewfinder. The pivotability of the operating device additionally makes it possible to align it differently relative to the viewfinder and operating unit depending on the purpose and position of a user (e.g. of a cameraman or of an assistant cameraman).

For example, the operating device can adopt a cameraman operating position in which it projects from the main body and in which the areal operating field display of the operating device is aligned such that its observation axis extends substantially in parallel with the optical axis of the eyepiece. The observation axis in this respect corresponds to a surface normal which extends away from the operating field display perpendicular from a central region of the operating field display. The operating field display is thus observed at a perpendicular angle of view from a point of this observation axis.

The named observation axis is preferably offset laterally relative to the optical axis of the eyepiece along which the viewfinder display is observed, i.e., with respect to a normal operation alignment of the viewfinder and operating unit in the horizontal direction. The normal operation alignment in this respect corresponds to that alignment of the control and operating unit in which it is typically used, for example by a cameraman. The viewfinder and operating device can in particular be particularly ergonomically adapted for this normal operation alignment. Furthermore, the normal operation alignment as a rule corresponds to that alignment in which video data (i.e. moving image data) are displayed in the correct orientation in the viewfinder display of the viewfinder (i.e. what is at the top in the image is displayed at the top).

Since the observation axis of the operating field display and the optical axis of the eyepiece of the electronic viewfinder are arranged in parallel with one another and laterally offset from one another in the manner shown in the cameraman operating position, a cameraman can in particular look simultaneously or alternately into the electronic viewfinder with one eye and can also observe the operating field display of the operating device from a substantially central perspective with his other eye. Not only the functions of an electronic viewfinder and of an operating device are thus only combined, but they can also be used comfortably simultaneously or substantially simultaneously by the same person without a change in position, i.e. without a head movement, of the cameraman being required for this purpose.

It is, however, alternatively also possible that the named observation axis (surface normal on the operating field display) is offset relative to the optical axis of the eyepiece with respect to a normal operation alignment of the viewfinder and operating unit in the vertical position, in particular upwardly, in the cameraman operating position. The cameraman hereby has to raise his gaze slightly, for example, to observe the operating field display of the operating device instead of the electronic viewfinder. In this alternative embodiment, the named side face of the main body (with which the operating device is associated) in particular forms an upper side face or a lower side face of the main body of the viewfinder and operating unit.

In addition to the cameraman operating position, the operating device of the viewfinder and operating unit can moreover also at least be pivoted into the named assistant operating position in which a rear side of the operating device contacts that side face of the main body with which it is associated. The operating field display is arranged in this position such that its observation axis is aligned substantially perpendicular to the optical axis of the eyepiece of the electronic viewfinder. The operating field display can in particular be aligned in parallel with the named side face in the assistant operating position and its observation axis can face away therefrom so that the operating field display can be freely observed from the side (or alternatively from above) with respect to the main body.

The viewfinder display is observed from a different direction than the operating field display in the assistant operating position, namely substantially perpendicular thereto. It is in particular possible in this manner that the operating field display is observed by one or more other persons than the one who is using the electronic viewfinder. An assistant cameraman can, for example, stand at the side of a cameraman with respect to the direction of gaze of the cameraman using the electronic viewfinder and can use the viewfinder and operating unit from this side. The assistant cameraman can then configure and/or control the video camera by means of the operating device and/or observe video data of the video camera on the operating field display of the operating device, optionally during a running shoot, while the cameraman looks through the electronic viewfinder.

The configuring and/or controlling of the video camera can comprise, for example, the switching on or switching off of the video camera, the starting and/or ending of a recording by means of the video camera, the starting, ending, accelerating and/or slowing down of a playback of recorded video data of the video camera and/or a storing and/or transmitting of video data of the video camera. However, only parts of the video camera or parts of a camera system associated with the video camera (for example an objective system) can also be controlled. In addition, the configuring of the video camera can, for example, comprise the setting of parameters of an objective of the video camera (for example, aperture, focus and/or zoom) and/or of recording parameters (for instance, the refresh rate, the exposure time, the selection of a specific recording mode, the sensitivity of the image sensor of the video camera, the setting of an automatic or manual white balance and/or the selection of a spatial resolution of the video data).

Furthermore, the viewfinder and operating unit is configured separate from the video camera so that it can be arranged outside the housing of the video camera. In this manner, the viewfinder and operating unit can be aligned flexibly and largely independently of an alignment of the video camera which may be unconventional under certain circumstances, with it in particular being able to be aligned with respect to a use by the cameraman or by an assistant which is as comfortable as possible. The viewer and operating unit can in this respect be adjustably fastened to the video camera, for example by means of a viewfinder holder, with the viewfinder holder being able to be configured, for example, as pivotal in the manner of a gooseneck holder and/or with telescopic elements. The viewfinder and operating unit can, however, also be spaced apart from the video camera and can only be connected to the video camera for communication. If the viewfinder and operating unit is not fastened to the video camera, it can advantageously also be carried freely in the hand and can thus be used particularly flexibly.

In a further development, the viewfinder display comprises an upper edge a lower edge and two side edges. For example, the viewfinder display can have the typical shape of an elongate rectangle, with the side edges forming the short sides of the rectangular shape. In this embodiment, the named side face of the main body is arranged adjacent to the named end face of the main body in the direction of one of the side edges. The upper edge, the lower edge and the side edges are defined with respect to the orientation in which video data are displayed on the viewfinder display as a rule, i.e. in normal operation. With a viewfinder display having two longitudinal sides and two narrow sides, the two longitudinal sides as a rule represent the upper edge and the lower edge respectively, while the two narrow sides are side edges of the viewfinder display. The named side face of the main body, with which the operating device is associated, is consequently arranged, in accordance with this further development, to the left or to the right adjacent to the end face of the main body having the electronic viewfinder. In the already named alternative embodiment, the named side face of the main body, with which the operating device is associated, can, however, also be arranged above or below the named end face of the main body (at which the electronic viewfinder is provided).

It is furthermore advantageous if the operating device is furthermore pivotable into a closed position relative to the main body, in which closed position the areal operating field display contacts the named side face of the main body. Unlike the assistant operating position, it is therefore not the rear side of the operating unit which contacts the named side face of the main body in the closed position, but rather the areal operating field display of the operating device. In this closed position, the rear side of the operating device can in particular face outwardly and be accessible so that, optionally, operating elements provided at the rear side of the operating device can likewise be accessible. The areal operating field display is advantageously protected outwardly, for example from mechanical effects, in the closed position since it contacts the named side face of the main body. The closed position can thus in particular correspond to a position which is set on transportation of the viewfinder and operating unit and/or in non-operation of at least the operating device of the viewfinder and operating unit.

The operating device and the main body can have a closing device which releasably fixes the operating device to the main body in the assistant operating position and/or in the closed position. The closure device can, for example, have a magnetic closure or a preloaded sliding bolt.

The operating device is preferably pivotable about a pivot axis into the cameraman operating position, starting from the closed position, with the pivot axis being aligned substantially perpendicular to the optical axis of the eyepiece and/or substantially vertical with respect to a normal operation position of the viewfinder and operating unit. For example, this pivot axis can be arranged at or close to an edge of the main body between the named side face and an adjacent surface of the main body, for instance an end side disposed opposite the end side with the optical viewfinder. The pivoting of the operating device from the closed position into the cameraman operating position thus corresponds to the flipping open of a side of the viewfinder and operating unit so that the areal operating field display is released for observation and/or operation. Since the pivot axis is aligned perpendicular to the optical axis of the eyepiece or vertically with respect to the normal operating position, a particularly simple and direct transition from the closed position into the cameraman operating position and back is made possible. This transition can in particular take place without any other adjustment movement being necessary in addition to the pivoting about this pivot axis. The operating device can preferably be pivoted at the main body of the viewfinder and operating unit by at least up to 90°, preferably by up to 180°.

In a preferred further development, the operating device is rotatable about an axis of rotation, starting from the cameraman operating position, and is subsequently pivotable about the named pivot axis into the assistant operating position, with the axis of rotation being aligned substantially perpendicular to the optical axis of the eyepiece and substantially perpendicular to the named pivot axis, and/or with the axis of rotation being aligned horizontally with respect to a normal operation alignment of the viewfinder and operating unit. The operating device has a particularly large number of degrees of freedom for its adjustment due to the combination of a pivot axis with an axis of rotation. This makes it possible to align the operating device and in particular its operating field display in a particularly flexible manner in accordance with changing respective demands. In this respect, the operating device can adopt a plurality of further positions in addition to the closed position, the cameraman operating position and the assistant operating position. For example, the operating field display can be rotated about the axis of rotation upwardly or downwardly with respect to the normal operation alignment out of the camera operating position in which it projects from the main body to allow a comfortable observation and/or operation of the operating field display from an angle from above or below. A rotation of at least up to 270°, in particular by a full 360°, about the axis of rotation is preferably possible.

The operating device is preferably fastened to the main body via a pivot/swivel joint. A support of the operating device by means of a pivot/swivel joint at the main body represents a constructionally simple manner to fasten the operating device to the main body pivotable about the named pivot axis, on the one hand, and rotatable about the named axis of rotation, on the other hand. The use of a pivot/swivel joint moreover allows the pivot axis and the axis of rotation substantially to cross so that there is a common pivot/rotation point about which the operating device can be pivoted and rotated. It is in particular possible that communication lines run in the pivot/swivel joint to transmit signals for the display of video data or of other content as well as for the configuration and/or control of the video camera from the operating device to the main body and vice versa.

In accordance with a further embodiment, the viewfinder and operating unit furthermore has a control device which is adapted to control the viewfinder display of the electronic viewfinder and/or the operating field display of the operating unit selectively for the display of video data of the video camera and/or to generate control commands for the video camera. The control device can, for example, be a microprocessor of the viewfinder and operating unit which can be arranged in the main body of the viewfinder and operating unit. The operating device and the electronic viewfinder can inter alia in particular be connected to the video camera via the control device. In this respect, the control device can, for instance, receive video data from the video camera and can forward them for their display selectively to the operating field display of the operating device and/or to the viewfinder display of the electronic viewfinder. In addition, it can, for example, be determined by means of the control device whether the video data are to be displayed simultaneously on the operating field display and on the viewfinder display or only on one of the displays.

The named control commands for the video camera can in particular be generated in dependence on the actuation of operating elements of the viewfinder and operating unit. Such operating elements can, for example, be provided at the main body of the viewfinder and operating unit and/or at the operating device, with in particular the areal operating field display of the operating device itself being able to represent an operating element if it is configured, for instance, with a touch-sensitive surface.

Provision is made in a further embodiment that the operating device furthermore has a plurality of selection keys which are arranged along at least one margin of the areal operating field display and that the control device is furthermore adapted to control the operating field display for displaying different selection symbols adjacent to a respective selection key and to generate an associated control command for the video camera in dependence on the displayed selection symbols and on an actuation of one of the selection keys. The selection keys can, for instance, be configured as so-called soft keys which can be arranged, for example, above an upper margin and/or beneath a lower margin of the operating field display. In this respect, no fixed function has to be associated with a respective selection key. A respective selection key can rather have different functions in dependence on a respective operating situation and/or on a respective alignment of the operating device. For characterizing the respective current function of a respective selection key, a selection symbol characterizing this function can be displaced adjacent to the respective selection key in the operating field display. Depending on which selection symbol is displaced adjacent to the respective selection key, an actuation of the selection key then has a different function corresponding to the respective selection symbol.

The function of a respective selection key can in particular comprise generating an associated control command for the video camera. The function can, however, also comprise setting the viewfinder and operating unit itself. Since the function of a respective selection key can be variable and can be characterized accordingly by means of the operating field display, comparatively few selection keys are sufficient at the operating device than would be required for the same functional extent when using selection keys with a fixedly associated function. Dispensing with a fixed association of a respective selection key with a specific function additionally makes it possible, for example, that a user of the viewfinder and operating unit can freely define the function of individual selection keys. The viewfinder and operating unit can be adapted particularly individually in this manner.

It is furthermore advantageous if the control device is furthermore adapted to control the viewfinder display of the electronic viewfinder and/or the operating field display of the operating device selectively for displaying graphical elements for the presentation and/or changing of configuration values. These graphical elements can in particular be a graphical user interface, for example having a menu structure. Graphical elements can comprise both symbols and text as well as arrangements of symbols and text without being restricted thereto. The display of the graphical elements can serve, on the one hand, to show different configuration values of the video camera in an illustrative manner. On the other hand, for instance for changing configuration values, they can be selected and adjusted using the graphical elements, with different alternative values e.g. being able to be displayed for selection for the adjustment.

In a further development, the control device is furthermore adapted to control the viewfinder display of the electronic viewfinder and/or the operating field display of the operating device selectively for the combined display of moved image data of the moved image camera and of graphical elements for the representation and/or changing of configuration values. It is thus possible to observe video data of the video camera and simultaneously to check and/or to change the set configuration values. For this purpose, the video data can, for example, be superimposed by graphical elements and/or can be embedded therein. The taking parameters with which the video data are or were recorded can in particular be displayed for respective video data. In addition to configuration values, the graphical elements can moreover also comprise additional information on respective video data.

In a further embodiment, the control device is furthermore adapted to control the viewfinder display of the electronic viewfinder selectively for the display of video data of the video camera and/or of graphical elements and simultaneously to control the operating field display of the operating device selectively for displaying other video data and/or graphical elements. The viewfinder display of the electronic viewfinder and the operating field display of the operating device can therefore be controlled simultaneously for displaying different content. For example, the current video data of the video camera as well as additional information relevant for the cameraman and configuration values can be displayed on the viewfinder display of the electronic viewfinder, while no video data or, for instance, a different portion of the video data, as well as information is/are displayed simultaneously on the operating field display which are especially relevant for an assistant camera during the shoot.

In accordance with an advantageous embodiment, the viewfinder and operating unit has at least one position sensor for determining an alignment, in particular an alignment of the operating field display. Functions of the viewfinder and operating unit can then be made dependent on the determined alignment of the viewfinder and operating unit by means of the position sensor.

It is furthermore preferred in this respect if the control device is adapted to control the operating field display of the operating device selectively to make a change of the display of video data of the video camera in dependence on the determined alignment. Alternatively or additionally, the control device can be adapted selectively to control the operating field display to make a change of a display of selection symbols (in particular for the already explained selection keys) and/or to make a change of a display of graphical elements (in particular of the already explained kind) in dependence on the determined alignment.

The named position sensor of the viewfinder and operating unit in particular serves to determine the alignment of the operating field display, for example, relative to the main body of the viewfinder and operating unit or the alignment of the operating field display in absolute terms (i.e. with respect to gravity). In this manner, for instance on a pivoting or rotating of the operating field display, the orientation of displayed video data can be adapted to a fixed change in the alignment and can in particular be rotated by 180°. Furthermore, the control device can be adapted to change the associated of displayed selection symbols and/or the association of control commands with the already explained selection keys (soft keys) and in particular to adapt them to a changed display of selection symbols in dependence on a determined alignment of the operating field display.

In accordance with a further advantageous embodiment, the viewfinder and operating unit has at least one proximity sensor for determining a respective arrangement state, in particular an arrangement state of the electronic viewfinder. Functions of the viewfinder and operating unit can then be made dependent on the determined respective arrangement state of the viewfinder and operating unit by means of the proximity sensor.

It is furthermore preferred in this respect if the control device is adapted to control the viewfinder display of the electronic viewfinder selectively to make a change of the display of video data of the video camera in dependence on the determined arrangement state. Since as a rule, the viewfinder display of the electronic viewfinder is observed from very close proximity with an eye brought to the eyepiece of the viewfinder, it can be detected by means of a proximity sensor, for example, whether an eye is in contact with the viewfinder display. This information is detected by the control device as an arrangement state which can then change the viewfinder display in dependence on the arrangement state. The viewfinder display can in particular be controlled by the control device only to display video data of the video camera when it is found that an eye is in contact with the eyepiece of the electronic viewfinder.

In a further development, the operating field display can be surrounded by a shield to screen the operating field display light being scattered in from the side. In this respect, the shield can in particular be foldable, with the shield being folded in the closed position of the operating device and being able to be unfolded on the opening of the operating device from the closed position or preferably unfolds automatically.

The viewfinder and operating unit preferably has one or more operating elements arranged at the main body and/or at the operating device, with the control device furthermore being adapted to generate an associated control command for the video camera in dependence on an actuation of one of the operating elements. The operating elements can for example, be push-buttons, rotary switches, rotary pressure switches, rockers and/or sliding switches with which a multiple of different functions can be associated. In this respect, the operating elements can be provided for setting the video camera and/or the viewfinder and operating unit, in particular the viewfinder display and/or operating field display.

At least one of the aforesaid operating elements is preferably arranged at the main body and/or at the operating device of the viewfinder and operating unit such that this operating element is also accessible when the operating device is located in the known closed position. A control command for the video camera and/or for the viewfinder and operating unit can thus also be generated when the areal operating field display of the operating device contacts the main body of the viewfinder and operating unit and the aforesaid selection keys of the operating device (which are arranged along a margin of the areal operating field display) are not accessible.

It is furthermore preferred if the main body has a fastening device for the tool-less releasable fastening of the main body to the video camera. In this manner, the viewfinder and operating unit can be fastened to or released from the video camera fast and without tools in order, for example, to be able to change between a free-handed use of the viewfinder and operating unit or a use of the viewfinder and operating unit in a fixed arrangement at the video camera. The conversion of a complex camera system is also simplified and accelerated by such a fastening device.

In a further embodiment, the main body has a signal transfer device which is adapted to receive video data and/or configuration values from the video camera and/or to transmit control signals and/or configuration values to the video camera. The main body can generally also have a plurality of such signal transfer devices. It is, however, preferably a single signal transfer device via which both the electronic viewfinder and the operating device can receive signals from the video camera and/or transmit them to the video camera. The signal transfer device can be configured to transfer signals in a wired or wireless manner, with it in particular being able to use known standards for this purpose.

In accordance with a further development, the viewfinder and operating unit can be connected via the signal transfer device to the video camera, preferably to a plurality of video cameras simultaneously. If the viewfinder and operating unit is simultaneously connected to a plurality of video cameras, the plurality of video cameras can be configured and/or controlled, for example, simultaneously by means of the one viewfinder and operating unit. Additionally or alternatively, an operating mode of the viewfinder and operating unit can be provided in which a respective one of the connected video cameras is selected to configure and/or control it and/or to display its video data.

It can furthermore be possible in a further development that a recording of video data is begun with a first video camera and then a change is seamlessly made to a second video camera connected to the viewfinder and operating unit, with the viewfinder displayer of the viewfinder and operating unit, for instance, respectively displaying the currently recorded video data, that is first the video data of the first video camera and subsequently the video data of the second video camera. It is furthermore possible that a plurality of video cameras connected to the viewfinder and operating unit simultaneously record video data and a selection and a change can be made at the viewfinder and operating unit on a running shoot as to from which video camera the video data are to be displayed on the viewfinder display and/or on the operating field display.

The connection of the viewfinder and operating unit to a video camera via the signal transfer device can also serve, in addition to the transfer of signals, for the power supply of the viewfinder and operating unit. The viewfinder and operating unit can, however, also be supplied with power via another connection, in particular a separate connection, from a respective video camera and/or from another external power supply. The viewfinder and operating unit preferably has, in addition to an external power supply, an energy store for the power supply integrated in or connectable to the viewfinder and operating unit.

The viewfinder display and the eyepiece of the electronic eyepiece are preferably configured as a closed assembly. The eyepiece can thus be particularly easily aligned with and optimized for the viewfinder display. In addition, a penetration of dirt between the eyepiece and the viewfinder display can be prevented. Alternatively or additionally, the imaging properties of the eyepiece can be adjustable to be able to compensate defective vision. The eyepiece can furthermore have at least one heating element to heat the eyepiece and hereby to be able to counteract an unwanted fogging of the optics.

The viewfinder display, like the operating field display, can comprise organic light-emitting diodes which can be controlled for the display of video data and/or graphical elements.

In accordance with a preferred further development, the main body has a connection section which can be selectively coupled to an end of a cable and has a holder section, wherein the holding section is adapted to hold a fixing section of the cable such that the region of the cable between the fixing section and the named end of the cable is substantially decoupled from force effects on other regions of the cable. For example, the named cable end can be configured as a plug, while the connection section of the main body has a socket complementary thereto. Since the end region of the cable by which the cable is connected to the main body is decoupled from force effects on the remaining cable, a release of the cable from the main body and damage to the cable and to the connection section can be avoided. If the named force effects are pulling effects, a strain relief of the end region of the cable thus results. In addition to pulling forces, however, bending forces acting on the cable can also be kept away from the end region of the cable which could result in torques or lateral forces in the region of the coupling between the cable and the connection section and which could, for example, damage a plug and/or a socket there.

In accordance with a further development, the holding section is adapted for clamping the fixing section of the cable. The named strain relief and decoupling of the cable end from force effects on the remaining cable can be achieved in a particularly simple manner in that the cable is fixedly supported close to the end to be protected by clamping. The cable can in particular be surrounded in a clamping manner at its fixing section.

In an embodiment, the holding section is configured in at least two parts with at least one fixed part and at least one moving part, which is in particular a releasable part, with the moving part being adapted to be fastened to the fixed part for holding the fixing section of the cable. In this respect, the fixed part of the holding section can be integrated into the main body of the viewfinder and operating unit. The moving part can then, for example, be a releasable clamp or a cover plate. The fastening to and/or releasing of the moving part from the fixed part can preferably take place tool-free or, for instance, by means of a coin. The connection section and the holding section of the main body of the viewfinder and operating unit can be configured such that the fixing section of a cable coupled to the connection section substantially necessarily comes to lie such that the fixing section is clamped between the fixed part and the moving part of the holding section on the fastening of the moving part of the holding section.

Furthermore, the moving part of the holding section can be adapted to cover, in particular to enclose, the region of the cable between the fixing section and the named end of the cable when the moving part is fastened to the fixed part for holding the fixing section of the cable. The fixed part of the holding section and the moving part of the holding section can in particular together form a substantially closed space in which the end of the cable can be received. When the cable is coupled to the connection section of the main body, a fastening of the moving part of the holding section to the fixed part has the result that the region of the cable between the fixing section and the end of the cable is enclosed in this space. The cable then exits this space at its fixing section between the moving part and the fixed part of the holding section of the holding section, with the fixing section in particular being held by the cooperation of the moving part and the fixed part.

In accordance with a further development, the connection section and the holding section are arranged such that a cable coupled to the connection section and held by the holding section extends in a downward direction away from the viewfinder and operating unit with respect to a normal operation alignment of the viewfinder and operating unit. Since a cable coupled to the viewfinder and operating unit via the connection section extends downwardly, in particular exits downwardly out of the viewfinder and operating unit, it is avoided that the cable's own weight produces pulling forces and bending torques on the cable end. On the other hand, a cable exiting downwardly out of the viewfinder and operating unit can be laid to a respective video camera particularly free of disturbance, in particular without projecting in a disturbing manner into regions which should remain visible or accessible.

The invention also relates, independently of other named features and embodiment, to a device having a connection section which can selectively be coupled to an end of a cable and having a holding section which is adapted to hold a fixing section of the cable such that the region of the cable between the fixing section and the named end of the cable is substantially decoupled from force effects on other regions of the cable. Further developments of this device result in combination with other named features and/or embodiments.

Alternatively to the use of a separate cable, the viewfinder and operating unit can have an integrated electrical and mechanical interface, i.e. the electrical line guide (signal transfer, power supply) is integrated into the fastening device via which the viewfinder and operating unit is mechanically fastened to the video camera.

In a further embodiment, the main body has two wide side faces disposed opposite one another, two narrow side faces disposed opposite one another and two end faces disposed opposite one another, with the electronic viewfinder being arranged at one of the two end faces and the operating device contacting one of the two wide side faces in the assistant operating position. For example, the main body can have the shape of an elongated parallelepiped or can substantially have the shape of an elongated parallelepiped (in particular with rounded corners and/or edges, and/or with a trapezoidal cross-section). Such a configuration of the main body allows a particularly compact design of the viewfinder and operating unit. In this respect, the surface of the operating field display can substantially correspond to the surface of the wide side face which the operating device contacts in the assistant operating position. In this manner, the dimensions of the main body are utilized as ideally as possible for a particularly large operating field display. The viewfinder display of the electronic viewfinder can in contrast be very much smaller since it is as a rule observed from close up through the eyepiece and can therefore also be arranged at one of the end faces.

The invention also relates to a video camera having a camera body which has a housing, an objective connection for connecting an interchangeable objective and an electronic image sensor, with the arrangement of the objective connection and of the image sensor defining a visual axis of the camera body. In addition, the video camera has a viewfinder and operating unit separate from the camera body in accordance with one of the above-explained embodiments, with the viewfinder and operating unit being arranged offset at the camera body or being releasably fastened thereto such that the optical axis of the eyepiece of the viewfinder and operating unit is moved in a vertical direction and in a horizontal direction relative to the visual axis of the camera body with respect to a normal operation alignment of the video camera. In this respect, the optical axis of the eyepiece of the viewfinder and operating unit can be substantially in parallel with the visual axis of the camera body.

When the viewfinder and operating unit is arranged or releasably fastened to the camera body as explained, the direction of gaze on the observation of the viewfinder display of the electronic viewfinder substantially corresponds to the visual axis of the video camera. The impression is produced in this manner as if the scene disposed behind is being observed through the viewfinder. The named horizontal and vertical offset of the optical axis of the eyepiece of the viewfinder and operating unit relative to the visual axis of the camera body as a rule does not disturb this impression, but can advantageously serve to align the viewfinder and operating unit particularly ergonomically. For example, a cameraman can carry the video camera by means of a shoulder support on the shoulder, with the viewfinder and operating unit then being able to be arranged such that the eyepiece of the electronic viewfinder comes to lie aligned substantially matching in front of the eye of the cameraman.

BRIEF DESCRIPTION OF THE DRAWINGS

The invention will be described in the following by way of example with reference to the Figures.

DETAILED DESCRIPTION OF THE PREFERRED EMBODIMENTS

Figure 1A:
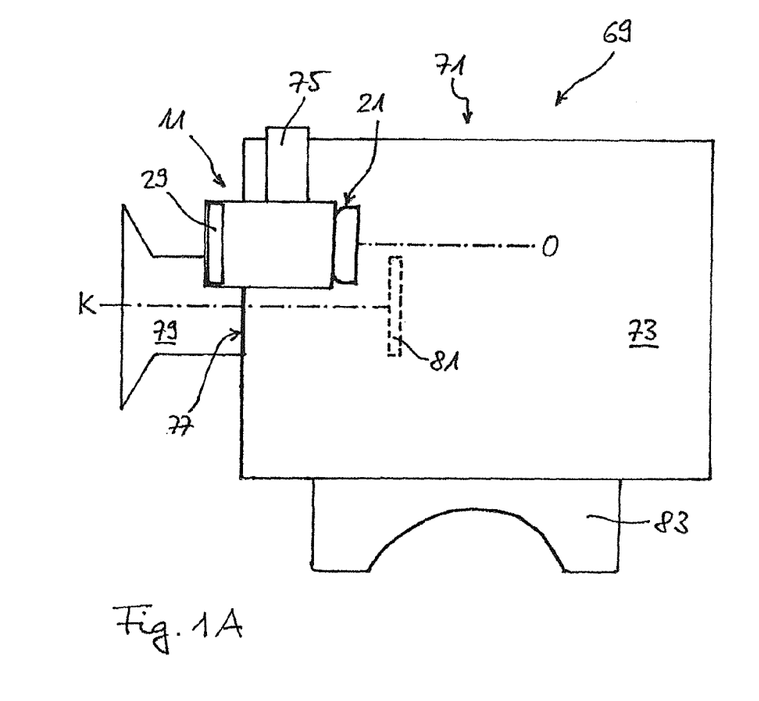
FIGS. 1A and 1B show an embodiment of a video camera having a separate viewfinder and operating unit from a side view and from a rear view respectively.
Figure 1B:
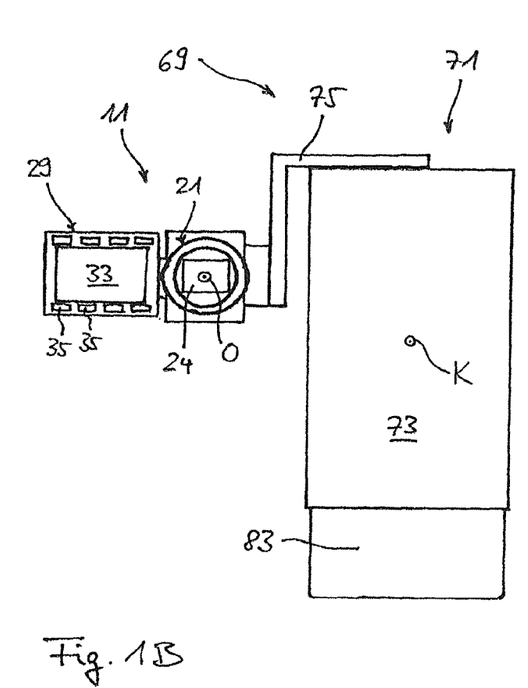

In FIGS. 1A and 1B, an embodiment of a video camera 69 is shown having a camera body 71 at whose housing 73 a viewfinder and operating unit 11 is arranged via a viewfinder holder 75. The viewfinder and operating unit 11 has an electronic viewfinder 21 and an operating device 29. For better clarity, the video camera and the viewfinder and operating unit 11 are, however, only shown schematically in FIGS. 1A and 1B, with the details being shown in FIGS. 2A to 2D and 3A and 3B and being explained in the following.

The camera body 71 of the video camera 69 comprises at an outside of the housing 73 an objective connection 77 for connecting an interchangeable objective 79 and comprises an electronic image sensor 81 (dashed) in the interior of the housing 73. A visual axis K (chain dotted) of the camera body 71 is defined by the arrangement of the electronic image sensor 81 and of the objective connection 77 and light of a scene to be recorded enters into the camera body 71 and is incident onto the electronic image sensor 81 along said visual axis. The viewfinder and operating unit 11 is in contrast aligned such that the optical axis O (here: chain-dotted) of an eyepiece 23 of the electronic viewfinder 21 is aligned in parallel with the named visual axis K of the camera body 71. In this respect, as can in particular be recognized in FIG. 1B, the optical axis O is offset both in the vertical direction and in the horizontal direction with respect to the visual axis K related to the normal operation alignment of the video camera 69 shown in FIGS. 1A and 1B.

The video camera 69 has at a lower side a shoulder support 83 with which the video camera 69 can be carried on the shoulder by a cameraman. The offset optical axis O of the eyepiece 23 of the electronic viewfinder 21 in this respect makes it possible that the electronic viewfinder 21 is arranged directly in front of an eye of the cameraman with a video camera 69 placed on the shoulder. The viewfinder holder 75 can optionally be adjustable to allow a suitable matching of the offset of the optical axis O with respect to the visual axis K of the camera body 71.

In FIGS. 1A and 1B, the operating device 29 of the viewfinder and operating unit 11 is shown in a cameraman operating position. In a direction of gaze such as is shown in FIG. 1B and is, for instance adopted by a cameraman, a viewfinder display 24 of the electronic viewfinder 21 as well as an operating field display 33 of the operating device 29 can easily be observed by a single person simultaneously and can supplement one another in their function. If, in contrast, the video camera 69 is observed from the side, as is shown in FIG. 1A, and, for instance, corresponds to the angle of view of an assistant cameraman, it is advantageous to be able to pivot and rotate the operating device 29 into an assistant operating position. In such an assistant operation position, the operating device 29 can be utilized, as will be explained in detail below, to observe video data of the video camera 69 from the side or to configure and/or to control the video camera 69 from the side.

FIGS. 2A to 2D show an embodiment of a viewfinder and operating unit 11 from a perspective view. In this respect, the viewfinder and operating unit 11 has a main body 13 which substantially has the shape of an elongated parallelepiped with two wide side faces 15, 15' disposed opposite one another, two narrow side faces 17, 17' disposed opposite one another and two end faces 19, 19' disposed opposite one another (cf. also FIGS. 3A and 3B). The viewfinder and operating unit 11 is aligned in FIGS. 2A to 2D such that a respective wide side face 15, a narrow side face 17 and an end face 19 can be seen.

An electronic viewfinder 21 is arranged at the end face 19 of the main body 13 at the viewfinder and operating unit 11. The electronic viewfinder 21 comprises an eyepiece 23 having an optical axis O (dashed) as well as a viewfinder display 24 (not shown in FIGS. 2A to 2D; cf. FIG. 1b) which is arranged behind the eyepiece 23 in the interior of the electronic viewfinder 21. The viewfinder display 24 can be observed from outside through the eyepiece 23, for which purpose as a rule one eye is moved close to the eyepiece 23.

A ring-shaped eye cup 25 is arranged around the eye piece 23 and projecting from it and is adapted to the anatomy of a human eye such that it closes the region between the eyepiece 23 and a contacting eye toward the sides with respect to disturbing light incidence. The electronic viewfinder 21 furthermore has a setting ring 27 with which the eyepiece 23 can be adjusted, in particular to be able to set the sharpness of the image of the viewfinder display 24.

An operating device 29 which has an areal operating field display 33 toward a front side is provided at the wide side face 15 of the main body 13 of the viewfinder and operating unit 11. Furthermore, a plurality of selection keys 35, which are configured as soft keys, are provided at the front side 31 of the operating device 29 above and below the operating field display. A rotary pressure switch 39 is moreover arranged at the rear side 37 of the operating device 29.

The operating device 29 is fastened to the main body 13 via a pivot/swivel joint 41 such that the operating device 29 is pivotable about a vertical pivot axis S (dashed) with respect to the normal operation alignment of the viewfinder and operating unit 11 shown in FIGS. 2A to 2D and is rotatable about a horizontal axis of rotation D (dashed), starting from this pivot axis S. Communication lines (not shown) extend in the pivot/swivel joint 41 which connect the operating device 29 and in particular the operating field display 33 and the selection keys 35 as well as the rotary pressure switch 39 to a control device 42 (shown schematically in FIGS. 2B and 2C) in the interior of the main body 13 of the viewfinder and operating unit 11.

The control device 42 is moreover connected to the viewfinder display 24 of the electronic viewfinder 21 and to operating elements 43 which are in particular arranged at the narrow side face 17 of the main body 13. The control device 42 is adapted to generate control commands for a video camera 69 (FIGS. 1A and 1B) connected to the viewfinder and operating unit 11 in dependence on an actuation of the selection keys 35 and/or of the operating elements 43. In addition, the control unit is adapted to control the viewfinder display 24 of the electronic viewfinder 21 and the operating field display 33 of the operating device 29 selectively to display video data of the video camera 69.

Figure 2A:
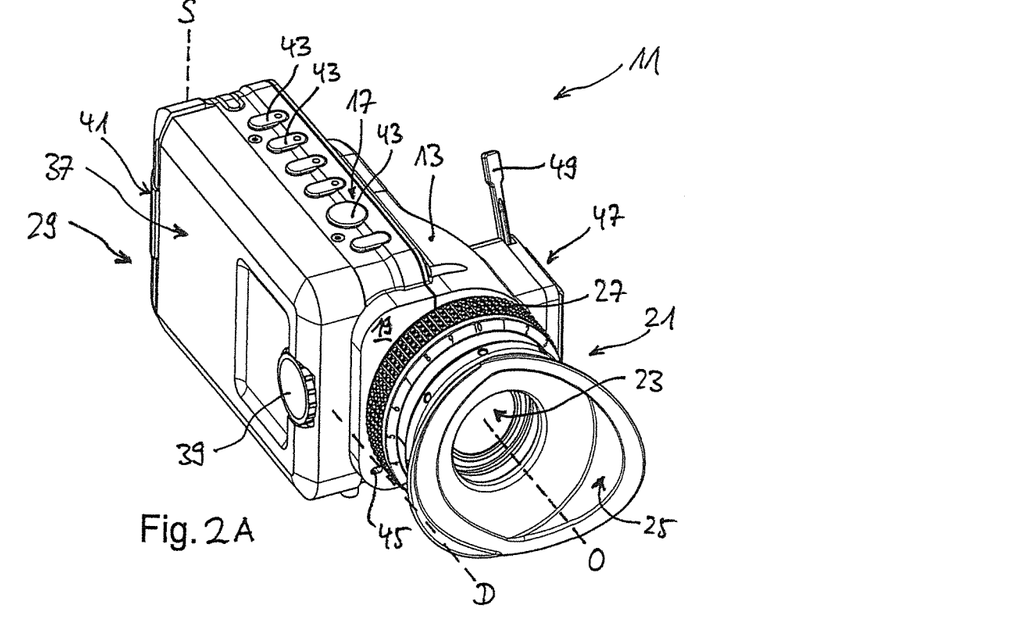
FIGS. 2A to 2D show an embodiment of the viewfinder and operating unit in a perspective view in four different positions of the operating device.

In FIG. 2A the viewfinder and operating unit 11 is shown in the closed position of the operating device 29 in which the areal operating field display 33 of the operating device 29 contacts the wide side face 15 of the main body 13. If the operating unit 29 is in the closed position, the operating field display 33 is switched off by the control unit of the viewfinder and operating unit 11 since it cannot be observed in this position. Video data of the video camera 69 are in particular displayed on the viewfinder display 24 of the electronic viewfinder 21 in this closed position. The viewfinder and operating unit 11 can be operated in the closed position of the operating device 29 by means of the operating elements 43 for the configuring and/or controlling of a connected video camera 69.

Figure 2B:
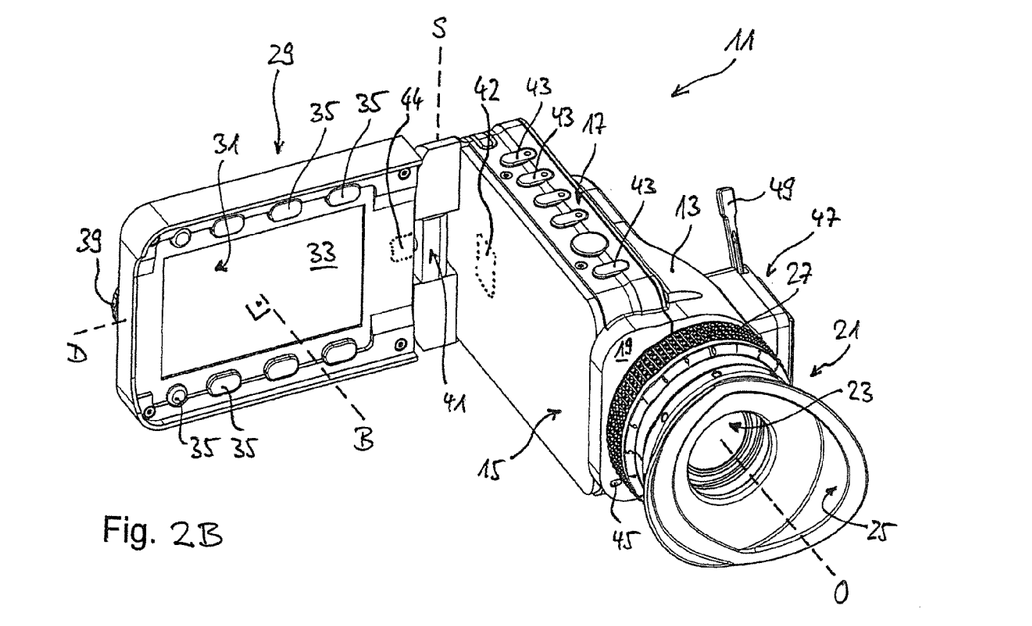

The operating device 29 can be pivoted out of the closed position shown in FIG. 2A by approximately 90° about the vertical pivot axis S into the cameraman operating position shown in FIG. 2B. In the embodiment shown, a pivoting about the pivot axis S beyond 90° is blocked by a stop so that the operating device 29 is pivoted maximally in the cameraman operating position and can thus be reliably set precisely.

The control device 42 of the viewfinder and operating unit 11 can control the operating field display 33 to display video data of the video camera in the cameraman operating position. The video data on the operating field display 33 can then be observed substantially from an observation axis B (dashed). Since the observation axis B and the optical axis O of the electronic viewfinder 21 are in parallel in the cameraman operating position, the operating field display 33 and the viewfinder display 24 of the electronic viewfinder 21 can be observed from substantially the same direction of view. A cameraman can, for instance, in particular observe the viewfinder display 24 of the electronic viewfinder 21 with one eye and simultaneously observe the operating field display 33 of the operating device 29 with the other eye.

Furthermore, the selection keys 35 of the operating device 29 are accessible in the cameraman operating position, for example after they have been activated by the control device 42, for setting the viewfinder and operating unit 11 and/or for configuring and/or controlling the moved image camera 69. In this respect, no fixed function is associated with a respective selection key 35. The function of a respective selection key 35 rather results from a respective selection symbol (not shown) displayed adjacently on the operating field display 33. For example, changes of configuration values can be carried out by means of the selection keys 35 and in particular also by means of the rotary pressure switch 39, with graphical elements being displayed in the manner of a graphical user interface on the operating field display 33 for assisting the operation of the operating device 29.

The control device 42 is in particular also adapted selectively to present status information and/or the aforesaid selection symbols and/or the aforesaid graphical elements at the operating field display 33 instead of or simultaneously with the video data.

Figure 2C:
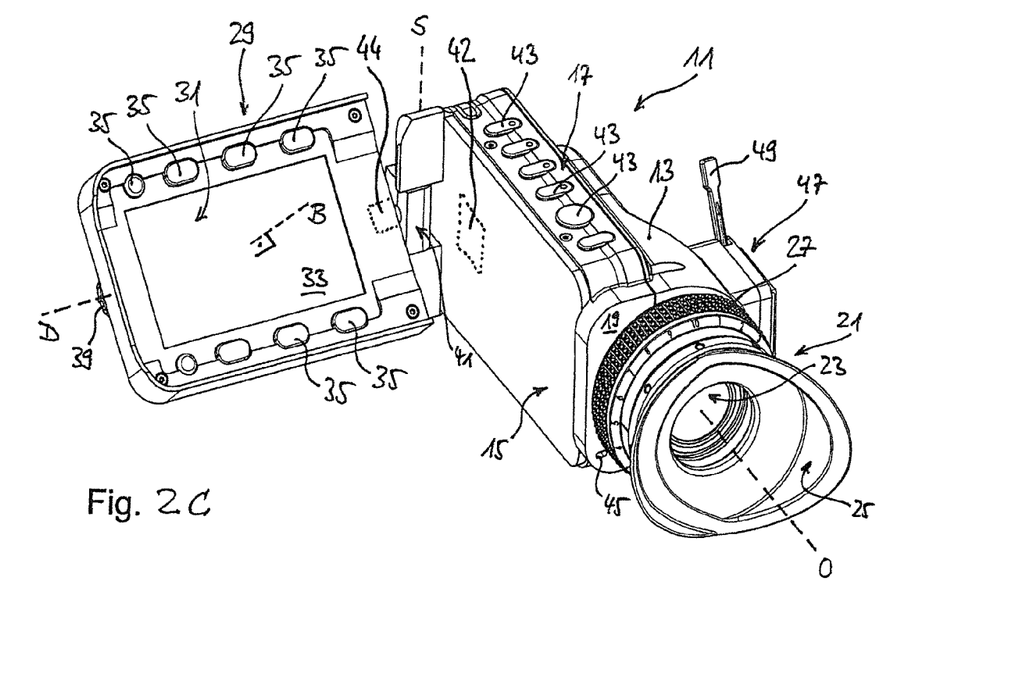

The operating device 29 can be rotated at the pivot/swivel joint 41 about a horizontal axis of rotation D (dashed) out of the camera operating position into different inclined positions, for example, into the position shown in FIG. 2C. In the embodiment shown, rotations by up to 90° downwardly and by up to 180° upwardly are possible starting from the cameraman operating position. The rotation of the operating device 29 about the axis of rotation D can in particular serve to allow an observation of the operating field display 33 and an operation of the operating device 29 also from different angles of view than a horizontal angle of view. This is useful, for example, when the viewfinder and operating unit 11 is arranged at a video camera 69 which is arranged particularly low for low-angle shots and is therefore operated obliquely from above or which is used overhead so that the viewfinder and operating unit 11 is observed and operated obliquely from below.

Figure 2D:
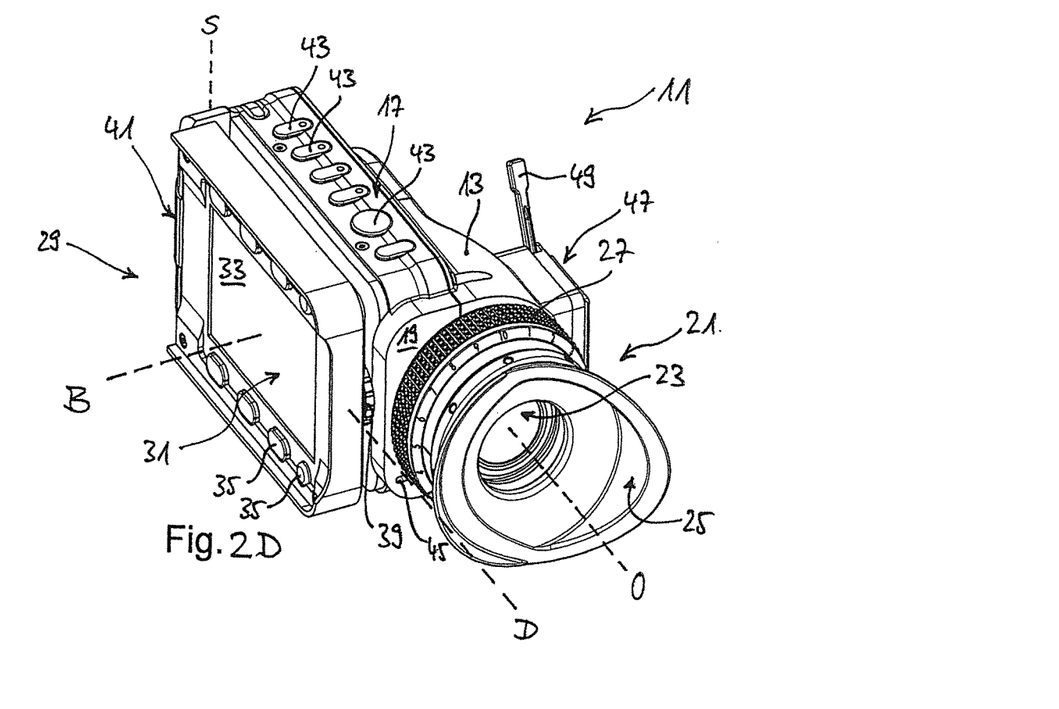

After a rotation of the operating device 29 starting from the cameraman operating position by 180° about the axis of rotation D, the operating device 29 can be pivoted about the vertical pivot axis S back to the wide side face 15 of the main body 13. In this respect, it is not the front side 31 and the operating field display 33 of the operating device 29 which contact the wide side face 15 of the main body 13, as in its closed position. but rather the rear side 37. This position of the operating device 29 represents the assistant operating position of the operating device 29 and is shown in FIG. 2D.

In the assistant operating position, the observation axis B of the operating field display 33 is aligned perpendicular to the optical axis O of the eyepiece. It is therefore possible in this position that, for example, a cameraman observes the viewfinder display of the electronic viewfinder 21 and, for example, an assistant cameraman simultaneously observes and operates the operating field display 33 from a lateral position aligned perpendicular thereto. The viewfinder and operating unit 11 can thus be used simultaneously by several persons without them impeding one another. In addition, the viewfinder and operating unit 11 can in this manner simultaneously satisfy different demands of, for instance, the cameraman and of the assistant cameraman. For the presentation of video data is, for example, particularly sharp and full of contrast in the viewfinder display due to the eyepiece 23 and the eye cup 25, as is particularly important in particular for the monitoring of a running shoot by the cameraman. The operating field display 33 can in contrast be of lower contrast, but in turn be able to be observed and/or operated simultaneously by several persons.

The operating device 29 has a position sensor 44 in its interior which is only shown in FIGS. 2B and 2C and with which the orientation of the operating device 29 with respect to the axis of rotation D can be determined. The position sensor 44 can in general be configured as a static acceleration sensor which detects the direction of gravity to be able to determine an alignment relative to gravity. In the embodiment shown, it is a rotary encoder arranged at the pivot/swivel joint 41. An alignment detected by means of the position sensor 44 is used for adapting the data shown on the operating field display 33. The orientation of the video data displayed on the operating field display 33 and/or the alignment of status information is/are reversed, i.e. likewise rotated by 180°, on a rotation of the operating device 29 by 180° about the axis of rotation D, that is, for instance, on the transition from the cameraman operating position into the assistant operating position. The alignment and/or the arrangement of the displayed selection symbols (assignment of the selection keys 35) can also be reversed (i.e. rotated about) 180° and/or regrouped (i.e. swapped over) in dependence on a signal of the position sensor 44. In this manner, video data are e.g. shown in the respective correct orientation with respect to the normal operation alignment of the viewfinder and operating unit 11 both in the cameraman operating position and in the assistant operating position, even though the operating field display 33 is so-to-say standing on its head. The arrangement of selection symbols for the selection keys 35 can thus also be maintained in the correct orientation in both positions, with naturally the association between the shown selection symbols and the selection keys 35 being adapted accordingly, i.e. the control device 42 generates a control command which corresponds to the changed selection symbol on actuation of one of the selection keys 35.

Furthermore, a proximity sensor 45, which determines by means of infrared light whether an eye is being led to the eyepiece 23 of the electronic viewfinder 21, is arranged at the end face 19 of the main body 13 of the viewfinder and operating unit 11. The display of video data on the viewfinder display 24 of the electronic viewfinder 21 can be made dependent on whether the proximity sensor 45 detects an arrangement state which corresponds to an eye brought up to the eyepiece 23. The viewfinder display 24 can in particular be controlled only to display video data and/or other data when an eye is in contact with the eyepiece 23. The viewfinder display can, however, also be switched on and off manually, for instance by actuating one of the operating elements 43.

Figure 3A:
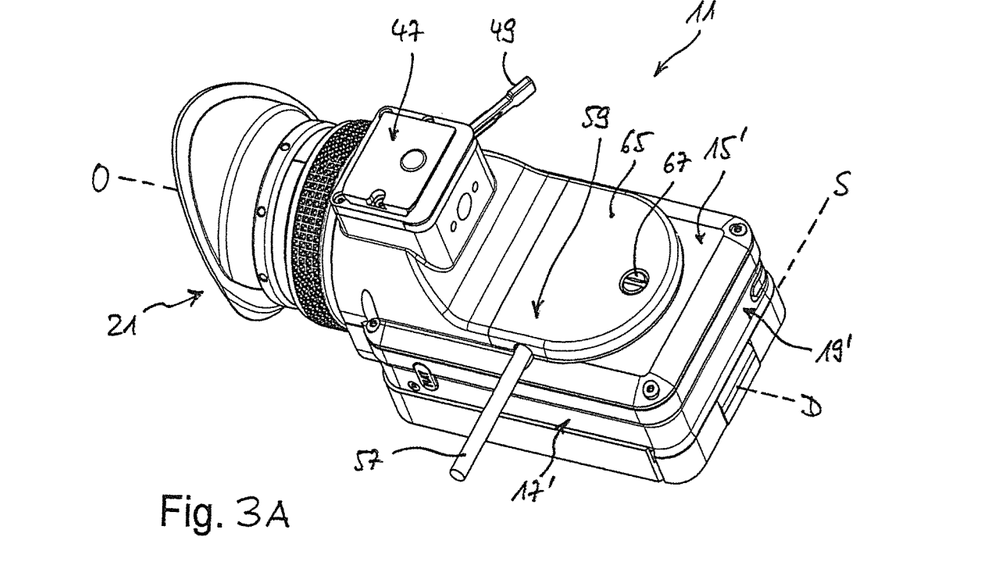
FIGS. 3A and 3B show the embodiment shown in FIGS. 2A to 2D in the closed position of the operating device from another direction of gaze.
Figure 3B:
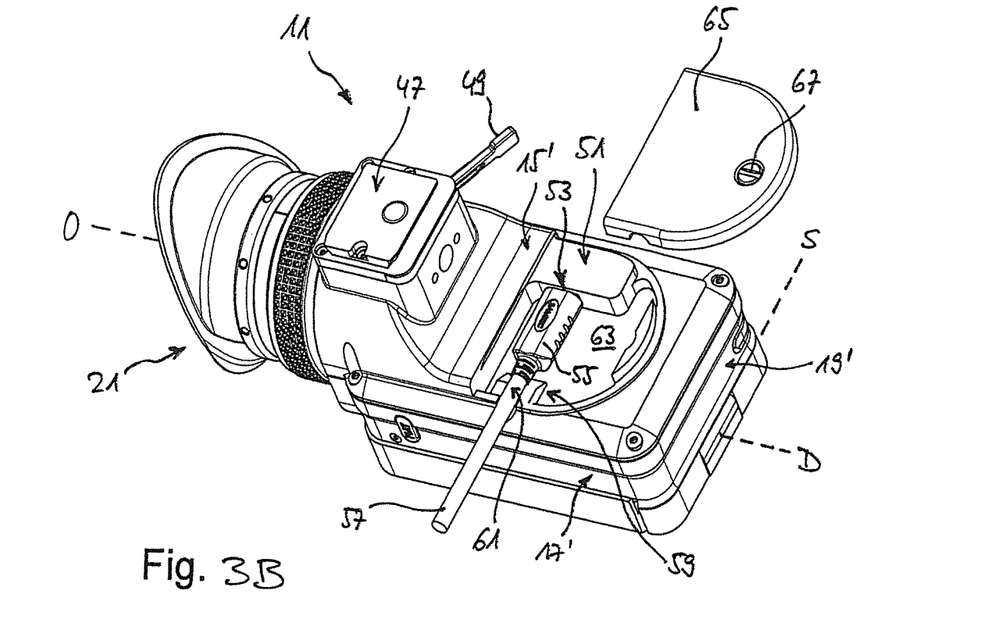

The embodiment of FIGS. 2A to 2D is shown from another perspective in FIGS. 3A and 3B in which the further wide side face 15', the further narrow side face 17' and the further end face 19' of the main body 13 of the viewfinder and operating unit 11 can be seen. The main body 13 has a fastening device 47 at the wide side face 15' and the viewfinder and operating unit 11 can be fastened via it without tools in the manner of a dovetail joint at a corresponding fastening section to a video camera 69 or to a viewfinder holder 75 (cf. FIGS. 1A and 1B) of the video camera 69. A lever 49 is provided at the fastening device 47 for the tool-less and releasable fastening and the named dovetail joint can be clamped by it.

A connection section 51 is furthermore provided at the side face 15' and has a socket 53 for receiving a plug 55 of a cable 57. The viewfinder and operating unit 11 can be connected via the cable 57 to a respective video camera 69 for communication. In this respect, video data can be transferred from the video camera 69 via the cable 57 and the connection section 51 to a signal transfer device (not shown) in the main body 13 of the viewfinder and operating unit 11 and further to the control device 42 of the viewfinder and operating unit 11. Conversely, control commands generated by the control unit can be output via the named signal transfer device at the connection section 51 of the main body 13 via the cable 57 to the video camera 69.

The main body 13 has a holding section 59 close to the connection section 51; it cooperates with a fixing section 61 of the cable 57. In this respect, the holding section 59 comprises a fixed part 63 and a moving part 65. The fixed part 63 is configured as a section of the main body 13 and is integrated into it, whereas the moving part 65 is configured as a cover plate which can be releasably fastened to the fixed part 63. This fastening takes place by means of a screw 67 which can be actuated by a fingernail or by a coin or by a similar object (not shown).

The fastening of the moving part 65 to the fixed part 63 of the holding section 59 has the result that the fixing section 61 of the cable 57 is clamped between the fixed part 63 and the moving part 65. At the same time, the region of the cable 57 between the fixing section 61 and the cable end having the plug 55 is enclosed in a closed space formed by the fixed part 63 and the moving part 65. In this manner, this cable region and equally the total connection section 51 of the control and operating unit 11 is protected from contamination and damage from the outside. In addition to this, the cooperation of the holding section 59 with the fixing section 61 also effects a strain relief for the coupling of the cable 57 to the connection section 51 and moreover prevents the occurrence of bending torques and other mechanical strains between the plug 55 and the socket 53.

The invention claimed is:

1. A viewfinder and operating unit (11) for a video camera (69) which is configured separate from the video camera (69) and which comprises:
 a main body (13);
 an electronic viewfinder (21) which is arranged at an end face (19) of the main body (13) and which has a viewfinder display (24) for displaying video data (24) of the video camera (69) as well as an eyepiece (23) for observing the viewfinder display (24), wherein the eyepiece (23) has an optical axis (O); and
 an operating device (29) which is pivotably fastened to the main body (13) and which is associated with a side face (15) of the main body (13) for configuring and/or controlling the video camera (69), wherein the operating device (29) has an areal operating field display (33), wherein the operating device (29) is pivotable relative to the main body (13) into at least a cameraman operating position and an assistant operating position, wherein in the cameraman operating position, the operating device (29) projects from the main body (13) and an observation axis (B) aligned perpendicular to the center of the areal operating field display (33) extends in parallel with the optical axis (O) of the eyepiece (23) as well as laterally offset in a horizontal direction therefrom and aligned in the vertical direction;

and wherein in the assistant operating position, the observation axis (B) of the operating field display (33) is aligned perpendicular to the optical axis (O) of the eyepiece (23) and a rear side (37) of the operating device (29) contacts the named side face (15) of the main body (13).

2. The viewfinder and operating unit in accordance with claim 1, wherein the viewfinder display (24) has an upper edge, a lower edge and two short side edges with respect to the upper edge and to the lower edge, and wherein the named side face (15) of the main body (13) is arranged adjacent to the named end face (19) of the main body (13) in a direction of one of the side edges.

3. The viewfinder and operating unit in accordance with claim 1, wherein the operating device (29) is furthermore pivotable relative to the main body (13) into a closed position in which the areal operating field display (33) contacts the named side face (15) of the main body (13).

4. The viewfinder and operating unit in accordance with claim 3, wherein the operating device (29) is pivotable about a pivot axis (S) into the cameraman operating position, starting from the closed position, wherein the pivot axis (S) is aligned perpendicular to the optical axis (O) of the eyepiece (23).

5. The viewfinder and operating unit in accordance with claim 3, wherein the operating device (29) is pivotable about a pivot axis (S) into the cameraman operating position, starting from the closed position, wherein the pivot axis (S) is aligned vertically with respect to a normal operating alignment of the viewfinder and operating unit (11).

6. The viewfinder and operating unit in accordance with claim 4, wherein the operating device (29) is rotatable about an axis of rotation (D), starting from the cameraman operating position, and is subsequently pivotable about the named pivot axis (S) into the assistant operating position, wherein the axis of rotation (D) is aligned perpendicular to the optical axis (O) of the eyepiece (23) and perpendicular to the named pivot axis (S).

7. The viewfinder and operating unit in accordance with claim 4, wherein the operating device (29) is rotatable about an axis of rotation (D), starting from the cameraman operating position, and is subsequently pivotable about the named pivot axis (S) into the assistant operating position, wherein the axis of rotation (D) is aligned horizontally with respect to a normal operation alignment of the viewfinder and operating unit (11).

8. The viewfinder and operating unit in accordance with claim 1, wherein the operating device (29) is fastened to the main body (13) via a pivot/swivel joint (41).

9. The viewfinder and operating unit in accordance with claim 1, wherein the viewfinder and operating unit (11) furthermore has a control device (42) which is adapted to control the viewfinder display (24) of the electronic viewfinder (21) and/or the operating field display (33) of the operating device (29) selectively to display video data of the video camera (69) and/or to generate control commands for the video camera (69).

10. The viewfinder and operating unit in accordance with claim 9, wherein the operating device (29) furthermore has a plurality of selection keys (35) which are arranged along at least one margin of the areal operating field display (33); and wherein the control device (42) is furthermore adapted to control the operating field display (33) for displaying different selection symbols adjacent to a respective selection key (35) and to generate an associated control command for the video camera (69) in dependence on the displayed selection symbols and on an actuation of one of the selection keys (35).

11. The viewfinder and operating unit in accordance with claim 9, wherein the control device (42) is furthermore adapted to control the viewfinder display (24) of the electronic viewfinder (21) and/or the operating field display (33) of the operating device (29) selectively to display graphical elements for the presentation and/or changing of configuration values.

12. The viewfinder and operating unit in accordance with claim 9, wherein the control device (42) is furthermore adapted to control the viewfinder display (24) of the electronic viewfinder (21) and/or the operating field display (33) of the operating device (29) selectively for the combined display of video data of the video camera (69) and of graphical elements for the presentation and/or changing of configuration values.

13. The viewfinder and operating unit in accordance with claim 9, wherein the control device (42) is furthermore adapted to control the viewfinder display (24) of the electronic viewfinder (21) selectively for the display of video data of the video camera (69) and/or of graphical elements and simultaneously to control the operating field display (33) of the operating device (29) selectively to display other video data and/or graphical elements.

14. The viewfinder and operating unit in accordance with claim 9, wherein the viewfinder and operating unit (11) has at least one position sensor (44) for determining an alignment, in particular an alignment of the operating field display (33), and wherein the control device (42) is furthermore adapted to control the operating field display (33) of the operating device (29) to make a change of the display of video data of the video camera (69) and/or to make a change of a display of selection symbols and/or to make a change of a display of graphical elements in dependence on the determined alignment.

15. The viewfinder and operating unit in accordance with claim 9, wherein the viewfinder and operating unit (11) has at least one proximity sensor (45) for determining a respective arrangement state, in particular an arrangement state of the electronic viewfinder (21); and wherein the control device (42) is furthermore adapted to control the viewfinder display (24) of the electronic viewfinder (21) to make a change of the display of video data of the video camera (69) in dependence on the determined arrangement state.

16. The viewfinder and operating unit in accordance with claim 9,
   wherein the viewfinder and operating unit (11) has one or more operating elements (39, 43) arranged at the main body (13) and/or at the operating device (29); and wherein the control device (42) is furthermore adapted to generate an associated control command for the video camera (69) in dependence on an actuation of one of the operating elements (39, 43).

17. The viewfinder and operating unit in accordance with claim 1,
   wherein the main body (13) has a fastening device (47) for the tool-less releasable fastening of the main body (13) to the video camera (69).

18. The viewfinder and operating unit in accordance with claim 1,
   wherein the main body (13) has a signal transfer device which is adapted to receive video data and/or configuration values from the video camera (69) and/or to transmit control signals and/or configuration values to the video camera (69).

19. The viewfinder and operating unit in accordance with claim 18,
   wherein the viewfinder and operating unit (11) can be connected via the signal transfer device to the video camera (69), preferably to a plurality of video cameras (69) simultaneously.

20. The viewfinder and operating unit in accordance with claim 1,
   wherein the main body (13) has a connection section (51) which can be selectively coupled to an end of a cable (57) and has a holding section (59), wherein the holding section (59) is adapted to hold a fixing section (61) of the cable (57) such that the region of the cable (57) between the fixing section (61) and the named end of the cable (57) is substantially decoupled from force effects on other regions of the cable (57).

21. The viewfinder and operating unit in accordance with claim 20,
   wherein the holding section (59) is adapted to clamp the fixing section (61) of the cable (57).

22. The viewfinder and operating unit in accordance with claim 20,
   wherein the holding section (59) is configured in at least two parts with at least one fixed part (63) and with at least one movable part (65), which is in particular a releasable part, wherein the moving part (65) is adapted to be fastened to the fixed part (63) for holding the fixing section (61) of the cable (57).

23. The viewfinder and operating unit in accordance with claim 22,
   wherein the moving part (65) is adapted to cover, in particular to enclose, the region of the cable (57) between the fixing section (61) and the named end of the cable (57) if the moving part (65) is fastened to the fixed part (63) for holding the fixing section (61) of the cable (57).

24. The viewfinder and operating unit in accordance with claim 20,
   wherein the connection section (51) and the holding section (59) are arranged such that a cable (57) coupled to the connection section (51) and held by the holding section (59) extends in a downward direction away from the viewfinder and operating unit (11) with respect to a normal operation alignment of the viewfinder and operating unit (11).

25. The viewfinder and operating unit in accordance with claim 1,
   wherein the main body (13) has two wide side faces (15, 15') disposed opposite one another, two narrow side faces (17, 17') disposed opposite one another and two end faces (19, 19') disposed opposite one another, wherein the electronic viewfinder (21) is arranged at one of the two end faces (19, 19') and the operating device (29) contacts one of the two wide side faces (15, 15') in the assistant operating position.

26. A video camera (69) having a camera body (71) which has a housing (73), an objective connection (77) for connecting an interchangeable objective (79) and having an electronic image sensor (81), wherein the arrangement of the objective connection (77) and of the image sensor (81) defines a visual axis (K) of the camera body (71), and having a viewfinder and operating unit (11) separate from the camera body (71), wherein the viewfinder and operating unit (11) comprises:
   a main body (13);
   an electronic viewfinder (21) which is arranged at an end face (19) of the main body (13) and which has a viewfinder display (24) for displaying video data (24) of the video camera (69) as well as an eyepiece (23) for observing the viewfinder display (24), wherein the eyepiece (23) has an optical axis (O); and
   an operating device (29) which is pivotably fastened to the main body (13) and which is associated with a side face (15) of the main body (13) for configuring and/or controlling the video camera (69), wherein the operating device (29) has an areal operating field display (33),
   wherein the operating device (29) is pivotable relative to the main body (13) into at least a cameraman operating position and an assistant operating position, wherein
   in the cameraman operating position, the operating device (29) projects from the main body (13) and an observation axis (B) aligned perpendicular to the center of the areal operating field display (33) extends in parallel with the optical axis (O) of the eyepiece (23) as well as laterally offset in a horizontal direction and aligned in the vertical direction therefrom; and wherein
   in the assistant operating position, the observation axis (B) of the operating field display (33) is aligned perpendicular to the optical axis (O) of the eyepiece (23) and a rear side (37) of the operating device (29) contacts the named side face (15) of the main body (13),
   wherein the viewfinder and operating unit (11) is arranged at or is releasably fastenable to the camera body (71) offset such that the optical axis (O) of the eyepiece (23) of the viewfinder and operating unit (11) is moved in a vertical direction and in a horizontal direction relative to the visual axis (K) of the camera body (71) with respect to a normal operation alignment of the video camera (69).

27. A viewfinder and operating unit for a video camera which is configured separate from the video camera and which comprises:
   a main body;
   an electronic viewfinder which is provided at an end of the main body and which comprises a viewfinder display for displaying video data of the video camera and an eyepiece for observing the viewfinder display, wherein the eyepiece has an optical axis; and an operating device for controlling the video camera, wherein the operating device is pivotably fastened to the main body and comprises an operating display which has an observation axis aligned perpendicular to a plane of the operating display;

wherein the operating device is pivotable relative to the main body into at least a cameraman operating position and an assistant operating position, wherein in the cameraman operating position, the operating device laterally projects from the main body and the observation axis of the operating display extends in parallel with the optical axis of the eyepiece and is laterally offset in a horizontal direction and aligned in the vertical direction from the optical axis of the eyepiece with respect to a normal operation alignment of the viewfinder and operating unit, such that a cameraman can look into the electronic viewfinder with one eye and observe the operating display with the other eye; and wherein in the assistant operating position, the observation axis of the operating display is aligned perpendicular to the optical axis of the eyepiece and the operating display faces away from a lateral side face of the main body.

* * * * *